Jan. 16, 1934.  C. G. HALL  1,943,384
MOLD FOR MAKING EDIBLE BOTTLES AND METHOD OF FILLING THE SAME
Filed Aug. 29, 1932  2 Sheets-Sheet 1
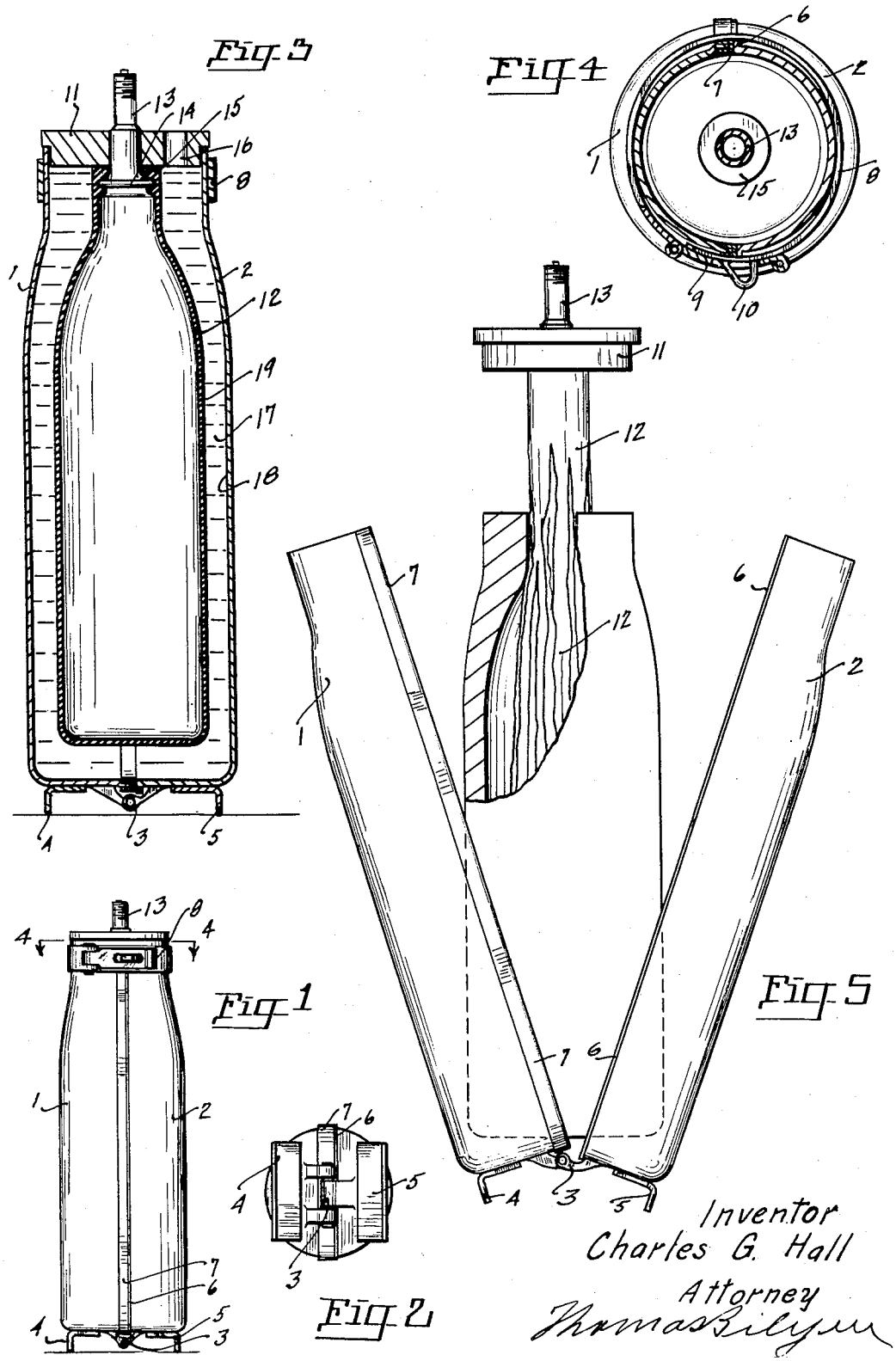
Inventor
Charles G. Hall
Attorney Jan. 16, 1934.     C. G. HALL     1,943,384
MOLD FOR MAKING EDIBLE BOTTLES AND METHOD OF FILLING THE SAME
Filed Aug. 29, 1932     2 Sheets-Sheet 2

Inventor
Charles G. Hall
Attorney

Patented Jan. 16, 1934

1,943,384

UNITED STATES PATENT OFFICE 1,943,384

MOLD FOR MAKING EDIBLE BOTTLES AND METHOD OF FILLING THE SAME

Charles G. Hall, Caldwell, Idaho

Application August 29, 1932. Serial No. 630,841

7 Claims. (Cl. 107—1)

The invention is primarily comprised of an open ended liquid-holding casing member having means for suspending a collapsible inner member in which the walls of the collapsible member are spaced apart from the inner walls of the casing member. A valve is adapted to the filling end of the collapsible member to facilitate the admission of a fluid therethrough. In my new and improved method of filling the same, I invert the liquid-holding member and place the same over filler tubes which are adapted for filling the space between the inner and outer members and for filling the collapsible member and inflating the same. Suitable piping and valves are provided for admitting the materials into the desired tubes in the members. One of the objects of my invention consists in providing a container for beverages that is made of edible material and that may be frozen or solidified by freezing to render the same portable and to render the same suitable for the maintaining of a beverage therein. The beverage may be made to impregnate the container and to increase the delicious taste of the container and to simultaneously chill the beverage. The beverage may then be drunk and the container eaten.

The primary object of my invention consists in providing a portable container that may be solidified by freezing and which may be used as a container for beverages and which is adapted for being eaten simultaneously with or after the beverage has been consumed.

A still further object of my invention consists in so forming and filling the edible container that it is adapted to mass production.

And a still further object of my invention consists in so constructing and so filling the same that the same may be placed on the market at minimum cost.

With these and incidental objects in view, the invention and the method consist in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of one of my new and improved forming containers comprised of separable half sections and that are adapted for being filled from the top and for being clamped together at the top during filling.

Fig. 2 is an inverted plan view of the mechanism illustrated in Fig. 1.

Fig. 3 is a sectional side view of the assembled device and in which the collapsible inner member is shown and the space disposed between the outer and inner members being filled with a fluid.

Fig. 4 is a sectional plan view of the mechanism illustrated in Fig. 1. This view is taken on line 4—4 of Fig. 1 looking in the direction indicated.

Fig. 5 is a side view of the holder shown hinged to facilitate the removal of the frozen edible container formed therein, and illustrating the collapsible inner member as being removed from the solidified edible container.

Like reference characters refer to like parts throughout the several views.

Figure 7:
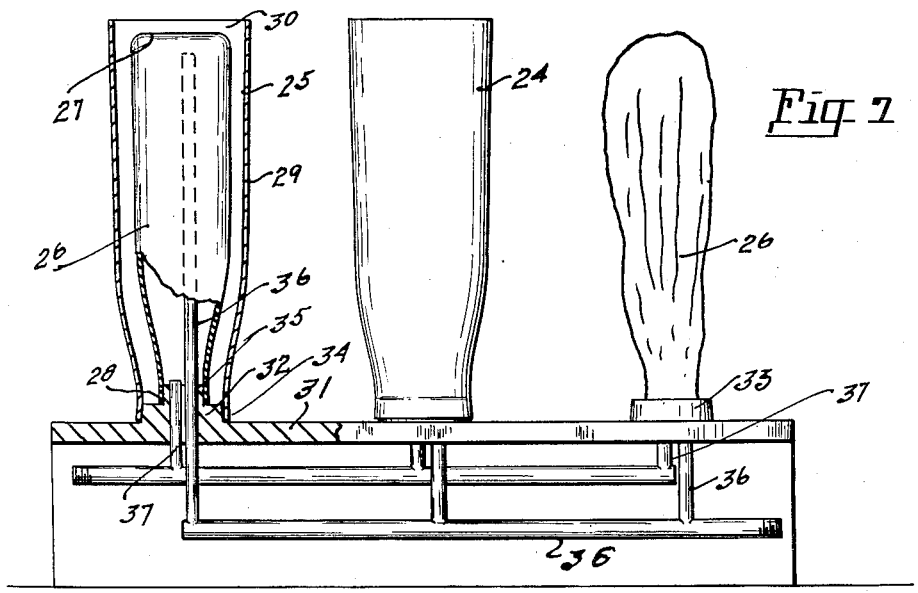
Fig. 7 is a front view partially in section of the containers illustrated in Fig. 6, and is made to further illustrate my new and improved method of forming and filling the same.

My new and improved edible container is primarily made from punch or other highly flavored fruit juices that are adapted for being solidified as by freezing, and the container is adapted for having a collapsible and expansible inner member disposed therein that is adapted for being suspended within the primary container and for having a space disposed between the outer surface of the inner container and the inner surface of the outer container which may be filled with the material which when solidified forms the bottle or container.

In one of the embodiments of my invention, I comprise the primary container of separable members 1 and 2. The separable members 1 and 2 may be made of any suitable non-corrosive material as nickel alloy metals. The same are hinged together at one end about a suitable hinging connection 3. Feet 4 and 5 are associated with the bottom end or the hinging end of the two separable members 1 and 2. A compressible gasket 6 is disposed within the edges of one of the primary holder-forming members, and a gasket receiving recess 7 is disposed in the opposite edge of the other primary holder-forming member in order that the gasket may be compressed within the recess to form a relatively liquid type holder. The two half section members 1 and 2 may be made to move and separate as by being moved toward and away from each other. If by being held in position and allowing mass production of large quantities is anticipated, the device may be made in such a manner and not here illustrated. A clamp 8 may be adapted to the neck or filling end of the separable members and this is particularly desirable where the hinging method of attaching the separable members is employed. The outer surface of the neck of the separable members may be made slightly tapering in order that a clamping action may be accomplished between the two members when the clamp is pressed downwardly therealong. The clamp may be hinged and secured together by a locking latch 9. The locking latch 9 is made to engage a locking loop 10, and the engagement of the latch with the loop removably secures the clamp to the neck of the filling end of the separable members.

A stopper or other filling member 11 is adapted to the open end of the assembled primary holder. A collapsible and expansible form 12 is adapted to the cork and is suspended therefrom. A valve 13 is adapted to the open end of the collapsible member 12, and is held relative thereto by a frictional engagement. An enlarged head 14 is disposed upon the valve and the same is adapted to a recess 15 disposed within the filling end of the member 12. A filler hole 16 is disposed within the cork. I first place the cork in position with the member 12 in collapsed position or in expanded position to the desired size and with a slight pressure developed therein, I then fill the space 17 disposed between the inner wall 18 of the primary container and the outer wall 19 of the inner or secondary container with any suitable material as a beverage or any other suitable liquid that is to be solidified as by freezing. The pressure within the secondary container should be sufficient only to prevent the collapsing of the secondary container from the hydrostatic pressure developed when the space 17 is filled with the liquid. The assembly may then be deposited in any suitable freezing medium as by being emersed in a chlorine brine solution of low temperature.

As soon as the liquid disposed within the space 17 has solidified or congealed, the collapsible secondary container 12 may then be momentarily filled with a warming fluid to disengage the secondary container from the frozen bottle thus formed and which may then be removed and be replaced. The bottle thus formed may then be maintained at low temperatures until it is delivered to the ultimate consumer, and which may then be filled with any suitable fluid. If the bottle thus formed is partially or semiporous, the dispensed filling material may be made to impregnate the edible solidified bottle. The frozen edible bottle thus formed may be sealed upon its inner surface with any suitable edible filling and sealing material as chocolate or any of the chocolate coating compounds, and which will render the same fluid tight. This will facilitate the drinking of the beverage or other filler material in advance of the eating of the bottle-like container itself.

Figure 6:
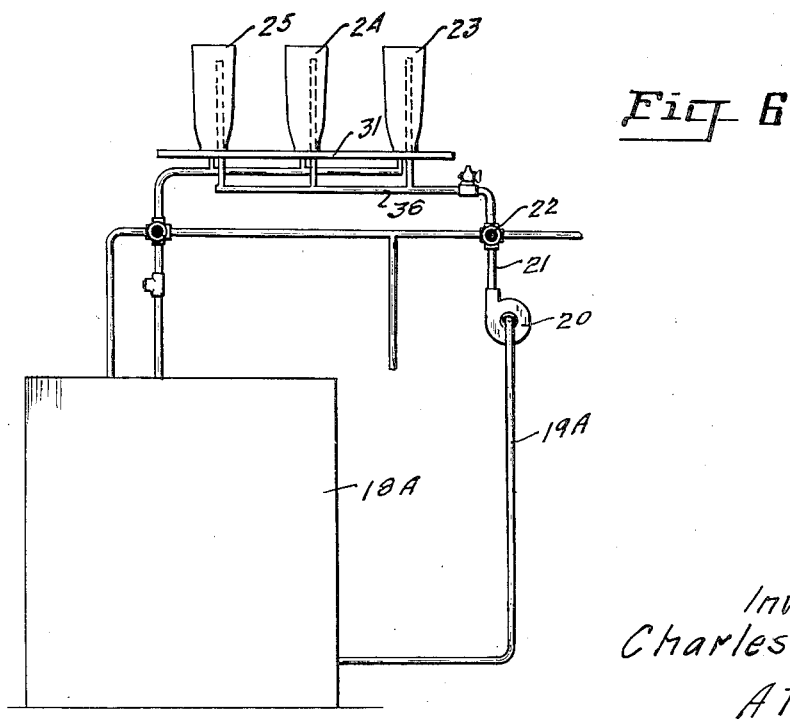
Fig. 6 is a front view of a hook-up and method for forming and filling a plurality of my improved edible containers simultaneously.

In Figs. 6 and 7 I have shown a modified form of primary container and a method of filling and handling the primary container and the secondary container after the same have been filled. 18A is a refrigerant-holding tank. A suction pipe 19A leads from the refrigerant-holding tank, and the refrigerant is circulated through the suction pipe 19A by a pumping unit 20. The pumping unit 20 is driven by any suitable means as by being direct electricaly driven. A discharge pipe 21 leads from the pipe 19A and a two-way valve 22 is disposed within the discharge pipe. The refrigerant is circulated through the secondary containers disposed within the primary containers here shown as three in number at 23, 24, and 25. The outside surfaces of the secondary containers 26 are made to decrease in cross-sectional area from the base 27 to the neck 28. They are so made to facilitate the withdrawal and removal of the frozen bottle formed around the secondary container and within the primary container.

When this method of making a form is employed the primary container 25 is opened at its base or filling end 29. The platform 31 has an upwardly extending boss 32, and the outer peripheral surface 33 of the boss is uniformly tapering to adapt the neck 34 of the primary container thereto by pressed engagement and to maintain a leak-proof joint therearound. The secondary boss, 35 upwardly extends from the primary boss 32 and the neck of the secondary container is adapted thereto by pressed engagement also.

When the primary and secondary containers are placed in position, the fluid to form the edible bottle is poured into the primary container and the same is frozen by the circulating of the refrigerant from the tubes 36 through the secondary container the top end of the tube 36 terminates near the inner base of the secondary container. The drain tube 37 drains the refrigerant therefrom.

As soon as the edible bottle has been frozen to a sufficient density to permit its removal from the molds, the valve 22 is closed for the passage of the refrigerant therethrough from the discharge pipe 21 and a warming fluid is admitted direct through the pipe 36 and the warmed fluid is permitted to flow until the seal is broken between the secondary container and the inside of the frozen bottle at which time the secondary container and the primary container and the frozen bottle are removed from the stand. Thereafter the primary container may be immersed in a thawing solution sufficiently to permit the removal of the frozen bottle from the primary container. The secondary container when this method is employed may be made collapsible or not at the will of the operator.

While the form of mechanism and the method herein shown and described is admirably adapted to fulfill the objects primarily stated, it is to be understood that it is not intended to confine the invention to the one form of embodiment and the one method herein shown and described, as it is susceptible of embodiment in various forms, and in various methods, all coming within the scope of the claims which follow.

What I claim is:

1. In a device of the class described the combination of separable hinged members, a compressible gasket disposed within the meeting face of one of the hinged members, a gasket receiving recess disposed within the meeting face of the other of the hinged members, removable clamping means for clamping the two hinged members together in closed position, a cork mounted within the united and open ends of the hinged members, a valve extending through the cork, a compressible and expansible secondary air-holding member suspended from the cork and in open communication with the valve disposed therein and a filler hole formed through the cork.

2. In a device of the class described the combination of a primary holder comprising separable members adapted to be united in liquid tight relationship when secured together, the primary holder being open at one end, a removable cork associated with the open end of the primary holder, a valve extending through the cork, a secondary holder made of live rubber and in open communication with the valve, and a filler hole formed through the cork.

3. In a device of the class described the combination of a primary holder, a live rubber secondary holder removably disposed within the primary holder and suspended therein from a cork mounted in the open end of the primary holder, the outer walls of the secondary holder being normally spaced apart from the inner walls of the primary holder, means for maintaining a pressure within the secondary holder and means for filling the primary holder and for encasing the secondary holder within the primary holder.

4. In a device of the class described, the combination of a bottle-shaped mold forming a primary container, a live rubber bottle-shaped inflatable bag forming a secondary container being disposed within the primary container and in spaced relation with the wall thereof means extending into the secondary container to permit introduction of a refrigerant thereinto, and means to permit introduction of a fluid into the space between the walls of said containers.

5. In a device of the class described, the combination of a bottle-shaped mold forming a primary container open at both of its ends, a live rubber bottle-shaped inflatable bag forming a secondary container, said secondary container being disposed within the primary container and in spaced relation with the wall thereof, means for supporting a plurality of said united primary and secondary containers in inverted position, and means extending through the supporting means for introducing into and draining from the interior of the secondary container a refrigerant, and said open ended primary container adapted to receive a fluid through its upper end to be disposed within the space between the walls of said containers.

6. A method of forming a hollow frozen confection consisting in placing an expansible container within a mold, inflating the container by forcing a refrigerant thereinto, then pouring the confection fluid into the mold and around the expansible container when so inflated.

7. A method of forming a hollow frozen confection consisting in placing an expansible container within a bottle-shaped mold, inflating the container to a shape corresponding to the shape of the mold and in spaced relation with the walls of the mold by forcing into the container a refrigerant, then pouring the confection fluid into the mold and around the expansible container.

CHARLES G. HALL.